US012354780B2

(12) United States Patent
Avuthu et al.

(10) Patent No.: US 12,354,780 B2
(45) **Date of Patent: *Jul. 8, 2025**

(54) APPARATUS, SYSTEM AND METHOD OF PRODUCING PLANAR COILS

(71) Applicant: JABIL INC., St. Petersburg, FL (US)

(72) Inventors: Sai Guruva Avuthu, St. Petersburg, FL (US); Mark Edward Sussman, St. Petersburg, FL (US); David Donald Logan, St. Petersburg, FL (US); Mary Alice Gill, St. Petersburg, FL (US); Nabel M. Ghalib, St. Petersburg, FL (US); Jorg Richstein, St. Petersburg, FL (US); Edward Joseph Collins, St. Petersburg, FL (US)

(73) Assignee: JABIL Inc., St. Petersburg, FL (US)

( * ) Notice: Subject to any disclaimer, the term of this patent is extended or adjusted under 35 U.S.C. 154(b) by 207 days.

This patent is subject to a terminal disclaimer.

(21) Appl. No.: 17/306,367

(22) Filed: May 3, 2021

(65) Prior Publication Data

US 2021/0265099 A1 Aug. 26, 2021

Related U.S. Application Data

(63) Continuation of application No. 15/598,044, filed on May 17, 2017, now Pat. No. 11,024,452.

(51) Int. Cl.

*H01F 27/28* (2006.01)
*H01F 5/00* (2006.01)
(Continued)

(52) U.S. Cl.

CPC ......... *H01F 27/2804* (2013.01); *H01F 5/003* (2013.01); *H01F 38/14* (2013.01); *H01F 41/043* (2013.01); *H01F 2027/2809* (2013.01)

(58) Field of Classification Search

CPC ...... H01F 27/2804; H01F 5/003; H01F 38/14; H01F 41/043; H01F 2027/2809; H01F 2017/006

See application file for complete search history.

(56) References Cited

U.S. PATENT DOCUMENTS

2003/0076210 A1 4/2003 Gomez
2006/0159899 A1 7/2006 Edwards
(Continued)

FOREIGN PATENT DOCUMENTS

CN 103308949 9/2013
CN 105097229 A 11/2015
(Continued)

OTHER PUBLICATIONS

Chinese Office Action (including English translation) issued in App. No. CN202210373881, dated Apr. 3, 2025, 12 pages.

*Primary Examiner* — Mang Tin Bik Lian
(74) *Attorney, Agent, or Firm* — Riverside Law LLP

(57) ABSTRACT

The disclosure provides at least an apparatus, system and method for providing a flexible planar inductive coil, such as may be embedded in a product. The apparatus, system and method may include at least one conformable substrate, and a matched function ink set, printed onto at least one substantially planar face of the at least one substrate. This printing may form at least one layer of additive conductive traces capable of receiving current flow from at least one source and layered into successive ones of the conductive traces about a center axis within a plane of the at least one conformable substrate.

19 Claims, 8 Drawing Sheets

(51) Int. Cl.
*H01F 38/14* (2006.01)
*H01F 41/04* (2006.01)

(56) References Cited

U.S. PATENT DOCUMENTS

| | | | | |
|---|---|---|---|---|
| 2006/0214759 | A1* | 9/2006 | Kawarai | H01F 17/0006 336/200 |
| 2006/0263727 | A1* | 11/2006 | Lee | H01L 24/10 430/394 |
| 2009/0146770 | A1 | 6/2009 | Lee | |
| 2010/0090824 | A1 | 4/2010 | Rowell | |
| 2010/0141369 | A1* | 6/2010 | Mori | H01F 17/0033 336/200 |
| 2010/0245011 | A1 | 9/2010 | Chatzopoulos | |
| 2012/0074233 | A1 | 3/2012 | Finn | |
| 2012/0223573 | A1 | 9/2012 | Schatz | |
| 2013/0241300 | A1 | 9/2013 | Miyamoto | |
| 2013/0249664 | A1* | 9/2013 | Tonoyama | H01F 17/0013 336/200 |
| 2014/0104133 | A1 | 4/2014 | Finn | |
| 2015/0035640 | A1* | 2/2015 | Wang | H01F 41/042 336/200 |
| 2015/0054455 | A1* | 2/2015 | Kim | H04M 1/03 320/108 |
| 2015/0340149 | A1* | 11/2015 | Lee | H05K 1/111 336/200 |
| 2016/0006123 | A1 | 1/2016 | Li | |
| 2016/0035477 | A1* | 2/2016 | Yeh | H01F 38/14 320/108 |
| 2016/0055948 | A1 | 2/2016 | Yosui | |
| 2016/0094082 | A1* | 3/2016 | Ookawa | H01M 10/425 320/108 |
| 2016/0163451 | A1* | 6/2016 | Wang | H01F 27/2804 336/200 |
| 2017/0133152 | A1* | 5/2017 | Kouchi | H01F 27/366 |
| 2017/0135215 | A1* | 5/2017 | Morshed | H05K 1/028 |
| 2017/0213648 | A1* | 7/2017 | Joyce | H01Q 1/2225 |
| 2018/0102211 | A1* | 4/2018 | Hanabusa | H01F 27/24 |
| 2018/0102213 | A1* | 4/2018 | Hanabusa | H01F 27/2804 |

FOREIGN PATENT DOCUMENTS

| | | |
|---|---|---|
| CN | 204991353 | 1/2016 |
| CN | 106463814 | 2/2017 |
| CN | 106537532 | 3/2017 |
| WO | 2018213608 A1 | 11/2018 |

* cited by examiner

APPARATUS, SYSTEM AND METHOD OF PRODUCING PLANAR COILS

RELATED APPLICATIONS

This application is a continuation application of application Ser. No. 15/598,044, entitled APPARATUS, SYSTEM AND METHOD OF PRODUCING PLANAR COILS, filed May 17, 2017, which is a national stage application of International Application No. PCT/US2018/033227, entitled APPARATUS, SYSTEM AND METHOD OF PRODUCING PLANAR COILS, filed May 17, 2018, the entireties of which are incorporated herein by reference as if set forth in its entireties.

BACKGROUND

Field of the Disclosure

The disclosure relates generally to additive electronics and, more particularly, to the production of planar coils.

Description of the Background

Printed electronics uses printing, or "additive," methods to create electrical (and other) devices on various substrates. Printing typically defines patterns on various substrate materials, such as using screen printing, flexography, gravure, offset lithography, and inkjet. Electrically functional electronic or optical inks are deposited on the substrate using one or more of these printing techniques, thus creating active or passive devices, such as transistors, capacitors, and resistors.

Printed electronics may use inorganic or organic inks. These ink materials may be deposited by solution-based, vacuum-based, or other processes. Ink layers may be applied one atop another. Printed electronic features may be or include semiconductors, metallic or non-metallic conductors, nanoparticles, nanotubes, etc.

Rigid substrates, such as glass and silicon, may be used to print electronics. Poly(ethylene terephthalate)-foil (PET) is a common substrate, in part due to its low cost and moderately high temperature stability. Poly(ethylene naphthalate) (PEN), poly(imide)-foil (PI), poly carbonate (PC), Silicone and Thermoplastic polyurethane (TPU) are examples of alternative substrates. Alternative substrates also include paper and textiles, although high surface roughness and high absorbency in such substrates may present issues in printing electronics thereon. In short, it is typical that a suitable printed electronics substrate preferably has minimal roughness, suitable wettability, and low absorbency.

Printed electronics provide a low-cost, high-volume volume fabrication. The lower cost enables use in many applications, but generally with decreased performance over "conventional electronics." Further, the fabrication methodologies onto various substrates allow for use of electronics in heretofore unknown ways, and without substantial increased costs. For example, printing on flexible substrates allows electronics to be placed on curved surfaces, without the extraordinary expense that the use of conventional electronics in such a scenario would require.

Moreover, conventional electronics typically have lower limits on feature size than do additive electronics. That is, higher resolution and large area electronics may be provided using printed electronics, thus providing variability in circuit density, precision layering, and functionality not available using conventional electronics.

Control of thickness, aspect ratio of the via holes, and material compatibility are essential in printing electronics. In fact, the selection of the printing method(s) used may be determined by requirements related to the printed layers, layer characteristics, and the properties of the printed materials, such as the aforementioned thicknesses, ink viscosities, and material types, as well as by the economic and technical considerations of a final, printed product.

Typically, sheet-based inkjet and screen printing are best for low-volume, high-precision printed electronics. Gravure, offset and flexographic printing are more common for high-volume production. Offset and flexographic printing are often used for both inorganic and organic conductors and dielectrics, while gravure printing is highly suitable for quality-sensitive layers, such as within transistors, due to the high layer quality provided thereby.

Inkjets are very versatile, but generally offer a lower throughput and are better suited for low-viscosity, soluble materials due to possible nozzle clogging. Screen printing is often used to produce patterned, thick layers from paste-like materials. Aerosol jet printing atomizes the ink, and uses a gas flow to focus printed droplets into a tightly collimated beam.

Evaporation printing combines high precision screen printing with material vaporization. Materials are deposited through a high precision stencil that is "registered" to the substrate. Other methods of printing may also be used, such as microcontact printing and lithography, such as nano-imprint lithography.

Electronic functionality and printability may counterbalance one other, mandating optimization to allow for best results. By way of example, a higher molecular weight in polymers enhances conductivity, but diminishes solubility. Further, viscosity, surface tension and solids content must be carefully selected and tightly controlled in printing. Cross-layer interactions, as well as post-deposition procedures and layers, also affect the characteristics of the final product.

Printed electronics may provide patterns having features ranging from 0.03-10 mm or less in width, and layer thicknesses from tens of nanometers to more than 10 μm or more. Once printing and patterning is complete, post treatment of the substrate may be needed to attain final electrical and mechanical properties. Post-treatment may be driven more by the specific ink and substrate combination.

In the known art, one type of electronic element that is fabricated using the afore-discussed conventional electronics techniques is inductive coils for various applications. The conventional processes used to form inductive coils for various applications involve high-vacuum, high-temperature deposition processes, and necessitate the use of sophisticated photolithographic patterning techniques. Consequently, these techniques historically employed to produce inductive coils lead generally to processing disadvantages, such as low throughput, significant processing resource requirements such as higher manufacturing temperatures, and hence appreciably more complex and resource-intensive fabrication processes, all of which cause unnecessarily high production costs and low production volume.

It will be understood by the skilled artisan that failure to dedicate the necessary processing resources, and hence to meet the high processing costs, needed to adequately fabricate inductive coils using known techniques may causes inadequacies that lead to detrimental effects on the performance of the coils thus formed. For example, inadequate formation of coils in acoustical embodiments may lead to acoustic distortion, which causes poor sound.

Therefore, a need exists for an apparatus, system and method of forming inductive coils for various uses via high volume, lower cost methodologies.

SUMMARY

The disclosure may provide at least an apparatus, system and method for providing a flexible planar inductive coil, such as may be embedded in a product. The apparatus, system and method may include at least one substrate, and a matched function ink set, printed onto at least one substantially planar face of the at least one conformable substrate. This printing may form at least one layer of additive conductive traces capable of receiving current flow from at least one source and layered into successive ones of the conductive traces about a center axis within a plane of the at least one conformable substrate.

The successive conductive traces may be rectangular, circular, octagonal, hexagonal, or ovular in design, for example. The flexible planar inductive coil may be an acoustical, antenna, or inductive coupling coil, by way of non-limiting example.

The coil may include at least one via at least partially filled with a conductor. The coil may include at least one second layer of second additive conductive traces capable of receiving current flow, such as through the via, from the at least one layer of additive conductive traces and layered into successive ones of the second conductive traces about a second center axis.

The at least one flexible substrate may be formed of plastic, glass, polymer, paper, or textile, by way of non-limiting example. The conductive traces may be screen printed, gravure printed, flexographically printed, inkjet printed, or aerosol jet printed conductive traces, for example. As discussed herein throughout, the flexible substrate may be, for example, conformable.

The successive conductive traces and/or features of the same may be of high density. The high density may provide a series resistance in a range of 16 ohms to 250 ohms, by way of non-limiting example. The high density may provide a line width in a range of 180 μm to 260 μm, for example. Ones of the inks of the matched ink set may have a bulk factor of between 1 and 15, by way of example.

Thus, the disclosure provides an apparatus, system and method of forming coils for various uses using high volume, lower cost methodologies.

BRIEF DESCRIPTION OF THE DRAWINGS

The exemplary compositions, systems, and methods shall be described hereinafter with reference to the attached drawings, which are given as non-limiting examples only, in which.

DETAILED DESCRIPTION

Figure 1:
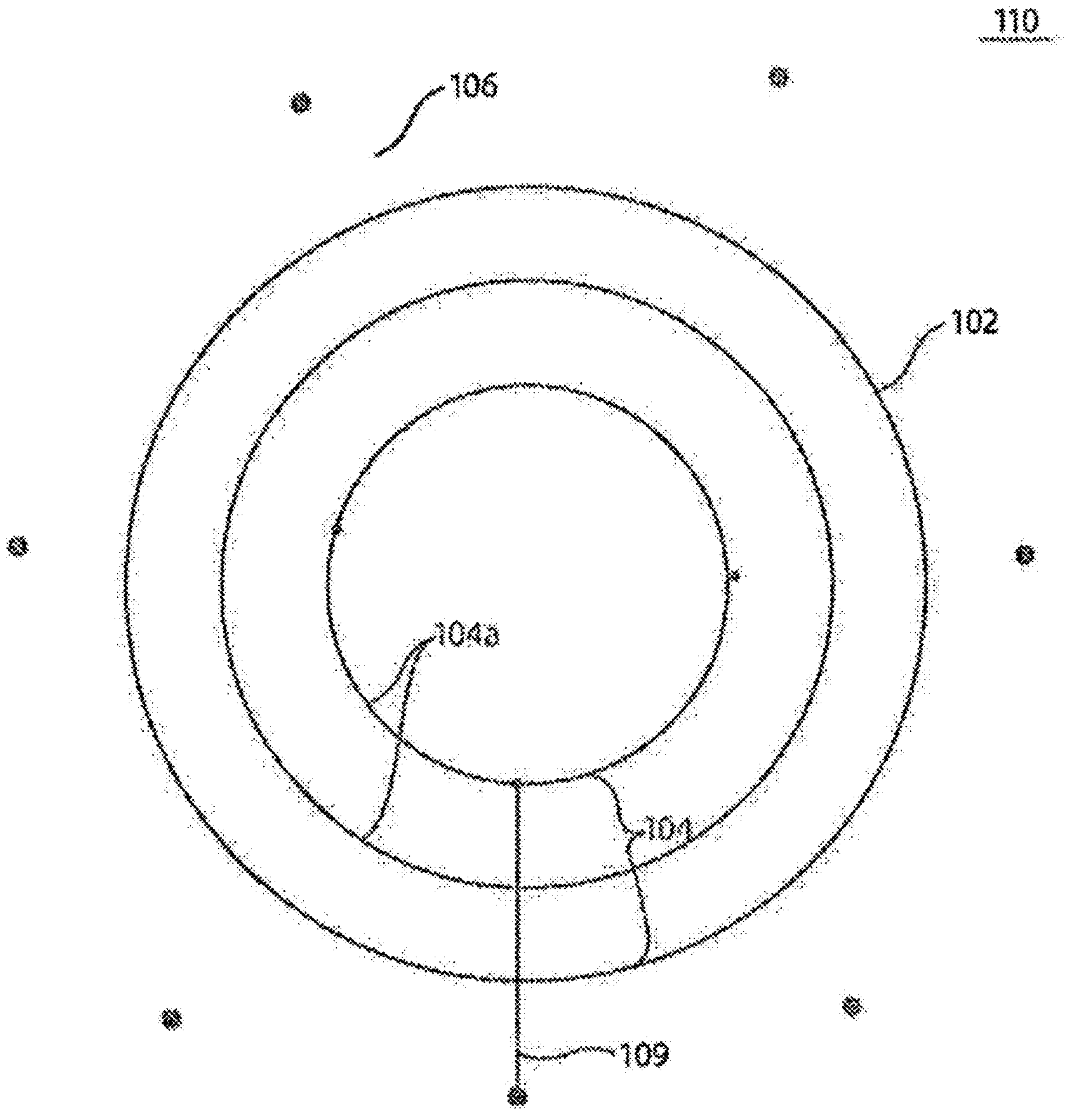
FIG. 1 is an illustration of a certain embodiment of a printed planar conductive coil.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "upon", "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

Historically and as discussed throughout, the formation of many small aspects of devices or small devices has generally integrated the processes of deposition and etching. That is, traces, such as conductive traces, dielectric traces, insulating traces, and the like, which include formation of device features such as wave guides, vias, connectors, and the like, have generally been formed by subtractive processes, i.e., by creating layers which were later etched to remove portions of those layers to form the desired topologies and features of a device.

Additive processes have been developed whereby device features and aspects are additively formed, i.e., are formed by "printing" the desired feature at the desired location and in the desired shape. This has allowed for many devices and elements of devices that were previously formed using subtractive, i.e., "conventional," processes to instead be formed via additive processes. Such device elements include, but are not limited to, printed transistors, carbon-resistive heating elements, piezo-elements and audio elements, photodetectors and emitters, and devices for medical use.

In short, the printing of such devices and elements is dependent on a number of factors, including the matching of deposited materials, such as inks, to the receiving substrates for particular applications. This ability to use a variety of substrates may afford unique properties to additively-processed devices that were previously unknown in etched devices, such as the ability for the created devices to stretch and bend, and/or to be used in previously unknown or inhospitable environments. By way of non-limiting example, the ability to print electronic traces on plasticized substrates allows for those substrates to be conformed after printing has occurred. Thereby, for example, appliance screens and similar interactive devices may be created and formed to the appliance to which the interactive elements are to be integrated after, rather than during, manufacture of the appliance.

However, known additive processes do present limitations over the properties previously available using subtractive processing. For example, it is typical that conductive traces formed using additive processes have more limited conductivity than the conductive traces previously formed using subtractive processes. This is, in part, because pure copper traces provided using subtractive processes are presently unavailable to be printed using modern additive processing. Accordingly, some devices and elements may be subjected to substantial modification in order to accommodate the modified properties available using printed traces in additive processes, as compared to the use of conventional electronics-formation techniques.

In the embodiments, a large number of factors must be balanced and/or weighted in each unique application in order to best arrive at properties that most closely approximate those properties previously available only in subtractive processes. For example, in the disclosed devices and processes for creating flexible and/or thin film planar and/or flat panel coil-based circuits, such as planar inductive coils, for various applications, compatibility must be assessed as between a substrate for a given application and the receptivity of such substrate, the inks employed and the conductivity thereof, the fineness of the printed traces used, the pitch, density and consistency of the printed inks, the type of printing performed, i.e., screen printing versus other types of printing, the thickness of the printed layers, the chemical reactivity of the substrate and the inks, and so on.

Moreover, because multiple inks may be employed in order to create the disclosed coil elements, the compatibility of the inks used with one another is also an aspect of the embodiments. For example, chemical reactions between inks, different curing methodologies between inks, and the manner of deposition as between inks must all be assessed for all inks within a given ink set. Also of note, the skilled artisan will appreciate, in light of the discussion herein, that different inks within an ink set may have variable characteristics after deposition. For example, certain inks may suffer from a valley effect in the center of a deposited trace of that ink, while peaks are created at the outer part of traces using that ink, post-deposition. Accordingly, because the thickness of a trace deposited using such an ink may allow for alleviation or heightening of the foregoing effect, the manner and consistency of application of each ink within an ink set may be noteworthy in the embodiments.

Balancing of the foregoing effects can lead to the use of printed electronics in heretofore unknown environments, such as to produce the disclosed planar inductive coils for various applications. Further, the suitability of printed electronics to be used with flexible substrates and substrates having uneven topologies may allow for printed electronics to be integrated as part of a product, instead of necessitating a mechanical integration of the electronics into a finished product. Needless to say, this may include the printing of electronics onto substrates unsuitable for accepting electronics created using subtractive processes, such as fabrics, plastics, and other substrates that do not provide "sticky" surfaces, organic substrates, and the like. This may occur, for example, because additive processes allow for different printing types within each subsequently printed layer of the printed device, and thereby the functionality provided by each layer, such as mechanical, electrical, structural, or other, may be varied as between printed layers throughout a deposition process. Further, other processes may be employed with or subsequent to the additive processes, such as laser selective printing.

The balancing and/or weighting of the foregoing factors, in whole or in part, may be performed by one or more algorithms applied in conjunction with one or more computing processing systems. That is, such algorithms may include compatibility, both environmentally and with materials, application-centric factors, and so on, in order to arrive at a set of deposited materials (also referred to herein as "ink sets") that is matched, or "inter-matched" as that phrase is used herein.

Various solutions to balance the foregoing factors may be provided using additive processing. For example, a flexible substrate may be provided, wherein printing occurs on one or both sides of the substrate. Such multi-facet printing may allow for certain disadvantages of additive processes to be overcome. This and other disclosed manner of overcoming issues in additive processing may allow for the printing of flexible, planar inductive coils, such as for use in acoustical, wireless power and antenna applications, on a flexible substrate, which may, at least in part, overcome the disadvantages of using conventional electronics processes to provide such inductive coils.

More specifically, in the known art, planar inductive coils for various applications have historically been fabricated using subtractive, i.e., conventional, processes. Such processes involved in the production of planar inductive coils, including slot die and C-MOS processes, involve high-vacuum, high-temperature deposition processes, and necessitate the use of sophisticated photolithographic patterning techniques. Consequently, the use of additive processes to produce these planar inductive coils provides numerous advantageous aspects over the known art, such as increased throughput, reduced usage of processing resources, lower manufacturing temperatures, and hence appreciably less complex and resource-intensive fabrication processes.

It will be understood by the skilled artisan that inadequacies in planar inductive coils can lead to detrimental effects on performance, such as is readily evident in acoustical applications, by way of example. For example, harmonic and acoustic distortion in acoustical embodiments may lead to poor sound. Likewise, insufficient stiffness in a sound-producing diaphragm may lead to poor sound, while too great a level of stiffness may allow for the production of no sound. These concerns, too, are addressed in the disclosed embodiments.

By way of non-limiting example and as referenced throughout, the disclosed techniques may allow traces to be produced on one or both sides of the substrate to form, for example, the referenced planar inductive coils in a multi-faceted, series, or parallel manner. In such instances, one or more vias may be created between the sides of the substrate, thus producing the series coils or parallel coils on opposing sides of the substrate which are then connectible through the substrate.

The foregoing and other advantages stemming from the direct printing of planar inductive coils on a variety of substrates, including printing on mechanically flexible substrates such as plastic, papers, and textiles, using known additive printing techniques, allows for an increased variety of applications for the planar inductive coils. Such applications may include, by way of non-limiting example, planar coils used in NFC or RFID antennae, such as for smart packaging, planar speaker diaphragms for acoustical applications, and inductive couplers such as for use in wireless power transmission.

As illustrated in the embodiment of FIG. 1 and in accordance with the disclosed processes, at least one conductive ink 102, such as an ink of silver, gold, aluminum, copper, and/or organic conductors from an inkset 104 is printed using known additive manufacturing processes, such as screen printing, gravure printing, flexography, inkjet printing, and/or aerosol jet printing, on a substrate 106, such as a glass, plastic, polymer, and/or fabric substrate, to form a planar polygonal or spiral coil 110. Of note, after deposition the inks 104, and the traces 110*a* created thereby, may necessitate secondary processing, such as drying or curing, in order to implement an active conductive trace.

Thereby, a planar inductive coil 110 may be created, which may receive/transmit from/to feed/source 109 and/or which may be coupled to other coils using conductive and/or inductive processes. Further and dependent on the substrate 106 used, the planar coil 110 may be formed around or integrated to nearly any surface having need of or use for such an inductive cool 110. As used herein, "planar" may imply the production of the disclosed coils substantially on a single plane, i.e., the printing, using additive processes, of one or multiple inductive coils on a single sheet substrate; or it may imply that the magnetic properties provided by such a coil occur along a uniform plane, i.e., that the embodiments provide a diaphragm formed as a plane within opposing magnetic fields.

In order to provide a "planar" coil, without the use of the subtractive processes used in the known art and which still meets required performance characteristics, such as those in acoustical embodiments, a balance between a number of factors for the inkset 104 and the printing techniques used may occur, as discussed above. For example, traces should be sufficiently thick so as to provide adequate conductivity, but traces of increased thickness may suffer from uneven mass. On the other hand, fine traces may be particularly desirable in acoustical embodiments, as this allows for enhanced numbers of traces in the formation of the magnetic field, which produces improved acoustical sound. However, increased line density increases the need for printing detail of each particular trace, and the more lines within the coil increases the resistivity of the system. That is, in the known art, due to the improved conductivity of bulk metal traces produced using subtractive processes, quality sound is produced; but in the disclosed embodiments, increased line density must be provided in order to enhance the efficiency of the magnetic field, and thereby improve the sound provided, using traces of lower conductivity but with higher trace density. However, this increased line density for a diaphragm produced using additive processes requires thinner lines and more refined processing for better resistivity control. That is, the optimization of conductivity to produce competitive sound with the known art also necessitates the optimization of resistivity, because resistivity is increased (which produces adverse effects) as line density is increased.

Figure 2:
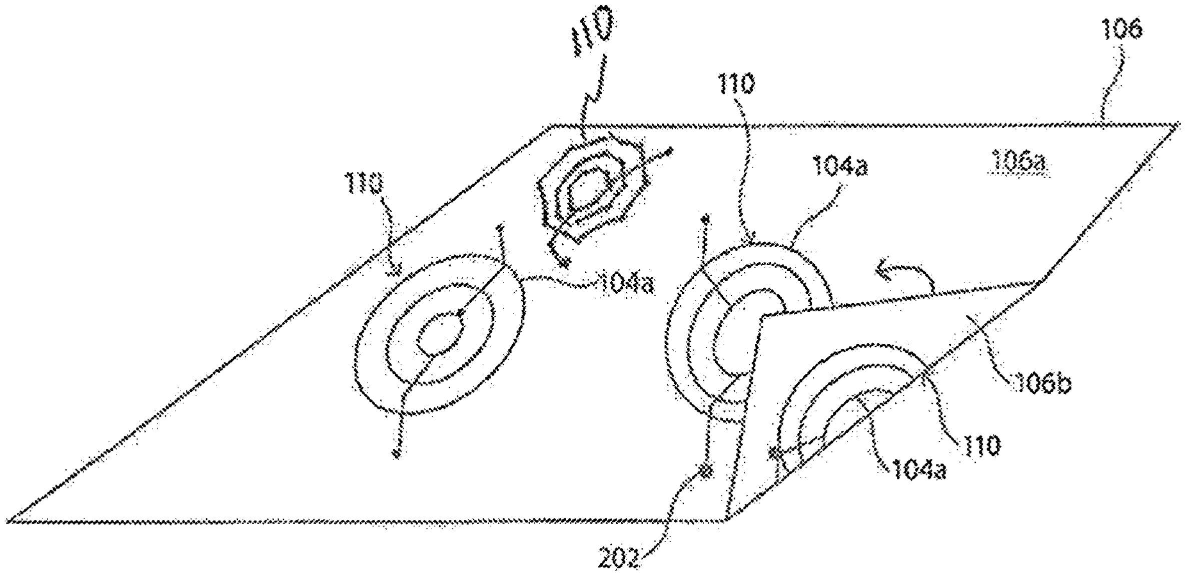
FIG. 2 is an illustration of a certain embodiment of a printed planar conductive coil.

Various solutions to balance the foregoing factors may be provided using additive processing. For example, a thin substrate 106 may be provided, wherein printing may occur on both sides 106*a*, 106*b* of the substrate 106, thereby producing coil traces 104*aa* on both sides 106*a*, 106*b* of the substrate 106, as illustrated in FIG. 2. Thereafter, a via 202, i.e., a hole, may be created between the sides 106*a*, 106*b* of the thin substrate, thus allowing for the production, such as via a conductive connection through via 202, of multiple coils adjacent to one another on both sides of the substrate which are connectible through the substrate. Alternatively or in addition to the above discussed arrangement, additional thin substrates 106 may be employed. For example, multiple thin substrates 106 may be "stacked" on one another, such as to provide multi-layer parallel or series circuitry. This may allow for the providing of parallel or series circuits using additive processes. As will be apparent to the skilled artisan, such parallel or series circuits may not be readily provided in the known art.

The foregoing characteristics may be used not only for acoustical applications, but, as mentioned herein above, may likewise be suitable for use in any inductive coupling application, such as in antennae applications. In each such application, inductance and series resistance are key factors in performance, and the planar nature of the embodiments herein, in conjunction with the series or parallel nature of certain of the embodiments, allows for a balancing of characteristics to at least substantially achieve optimal performance. In short, the series resistance provided by the embodiments may be in the range of 16 ohms to 250 ohms, by way of non-limiting example, thus allowing for acceptable acoustic performance, for example.

Various substance characteristics provide for the disclosed performance levels. For example, inks in inkset 104 having higher conductivity, and hence more bulk-like properties for the conductive traces 104*a* resultant therefrom, may be desirable for use in the embodiments. However, high conductivity inks may typically be high flow and low viscosity. As such, and because, as discussed above, the fineness of the traces is key in a higher density coil, the inks employed in the embodiments herein may be of low enough conductivity so as to have a sufficiently high viscosity so as not to bridge across traces 110*a* of the coil diaphragm, which would disadvantageously form short circuits in the electric and magnetic fields. Consequently, inks employed to form the traces discussed herein may have a bulk factor of between 1 and 15, by way of non-limiting example. Further, standard printing alignments and techniques for inks of such bulk factors may be used in conjunction with the embodiments. Moreover, additional additive printing layers, such as centering, and protective, dielectric, and/or insulating layers, may be employed to form the planar inductive coil 110, or aspects thereof, in certain of the embodiments.

More specifically, and by way of non-limiting example, a conductive ink, such as Henkel 479SS, may be employed to form coil 110. Further, other additive processing materials, such as conductive epoxies, such as Ablestic ABP2031S, may be employed to create one or more vias between different conductive layers. Further and by way of non-limiting example, a dielectric ink may be used to insulate the conductive traces from any other layers, such as chemically and/or electrically, and so on. Moreover, such inks, conductive epoxies, and other elements may enable application of certain of the embodiments to particularly thin substrates, such as a substrate having a thickness in the range of 10 μm-10 mm, such as 0.25 mm. One such available exemplary substrate is Melenex ST510PET by DuPont.

Figure 3:
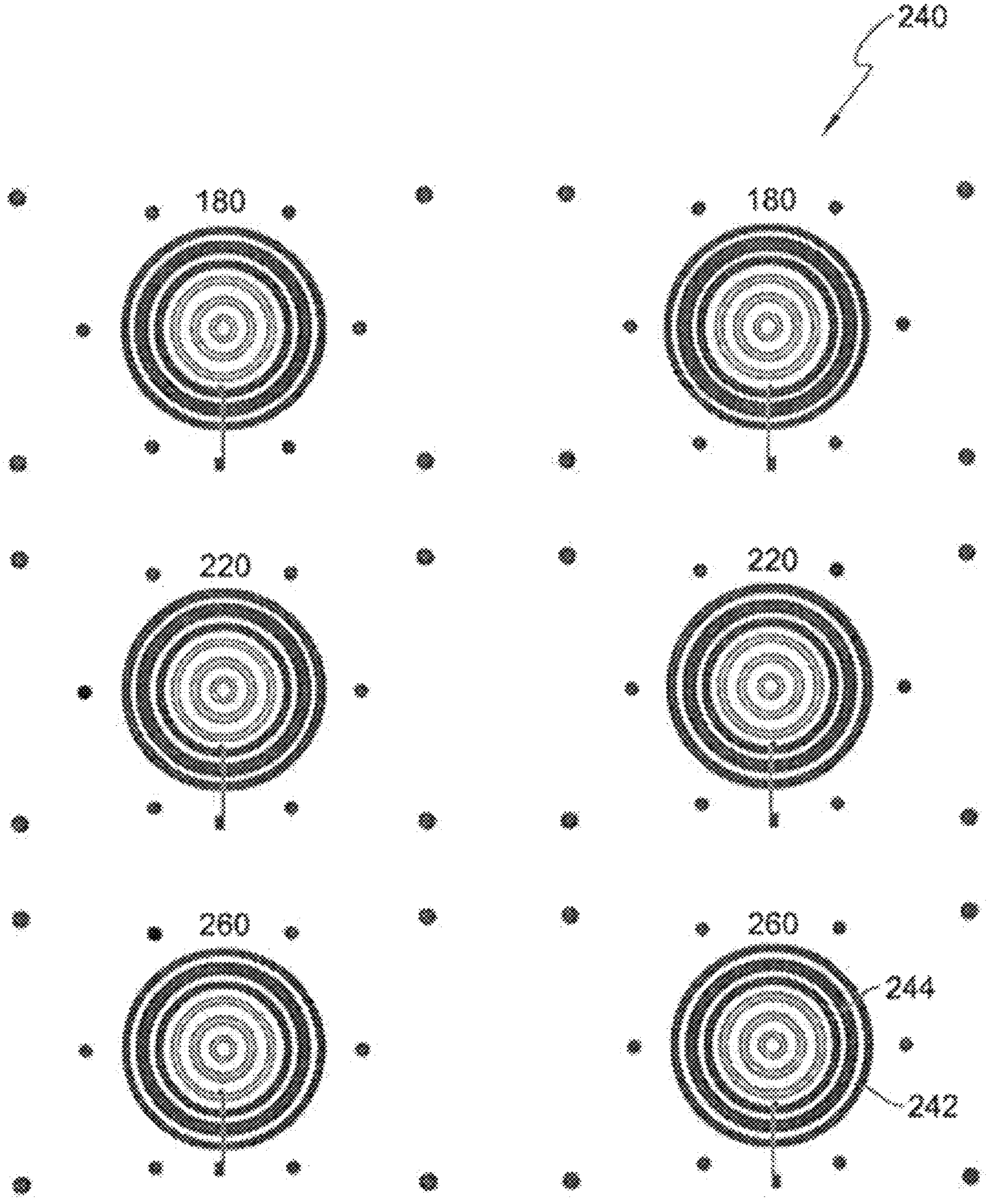
FIG. 3 is an illustration of a certain embodiment of an image carrier.

FIG. 3 illustrates an image carrier 240 which may be suitable for the printing of planar inductive coils 110 using additive processes. The image carrier 240 may take the form of a screen, a digital image carrier for screen printing and digital printing, and other dorms of depositions. The image carrier 240 may include, by way of example, line widths and/or gaps of various sizes, such as, for example, line widths 242 and/or gaps 244 of 180 μm, 220 μm, 260 μm, or the like. Moreover, known alignment techniques may be employed to properly align the screen printing, such as including two-sided printing alignment techniques. For example, known techniques may be used to create vias between coils using the screen 240 or other print methodologies, and/or to cut the printed coils into preferred design sizes. Table 1, below, provides a variety of exemplary screen specifications, such as may be used for the image carrier 240.

TABLE 1

| | |
|---|---|
| Mesh | 325 SS |
| Angle of mesh | 22.5° |
| Wire diameter | 0.0011" [27.94 μm] |
| Emulsion type | MS-14 |
| Emulsion thickness | 0.0005" [13 μm] |

Figure 4:
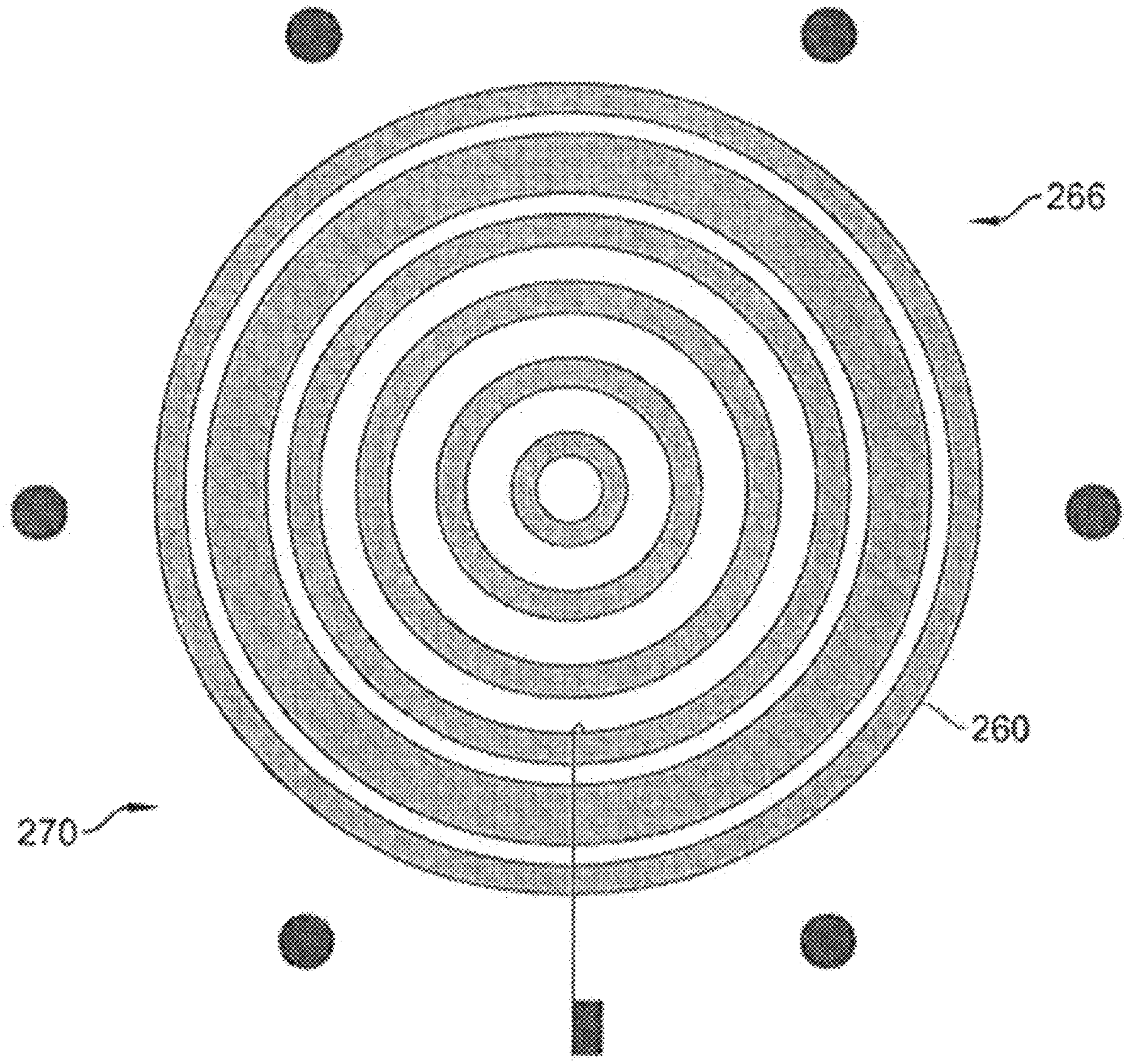
FIG. 4 is an illustration of an exemplary fabricated planar inductive coil.

FIG. 4 illustrates exemplary fabricated inductive coils 260 on a top side 266 of an exemplary substrate 270. Such fabricated coils 260 may provide one or more planar and/or flat panel circuits, such as may include one or multiple transducers, by way of non-limiting example. The average dimensions for printed line widths and gaps in certain embodiments, such as that of FIG. 4, are illustrated below in Table 2.

TABLE 2

| Parameter | Measured value |
|---|---|
| Line height | 4.58 ± 0.6 μm |
| Line width | 243.6 ± 6 μm |
| Gap | 123.2 ± 6 μm |
| Line gain | ~35.5% |

Figure 5:
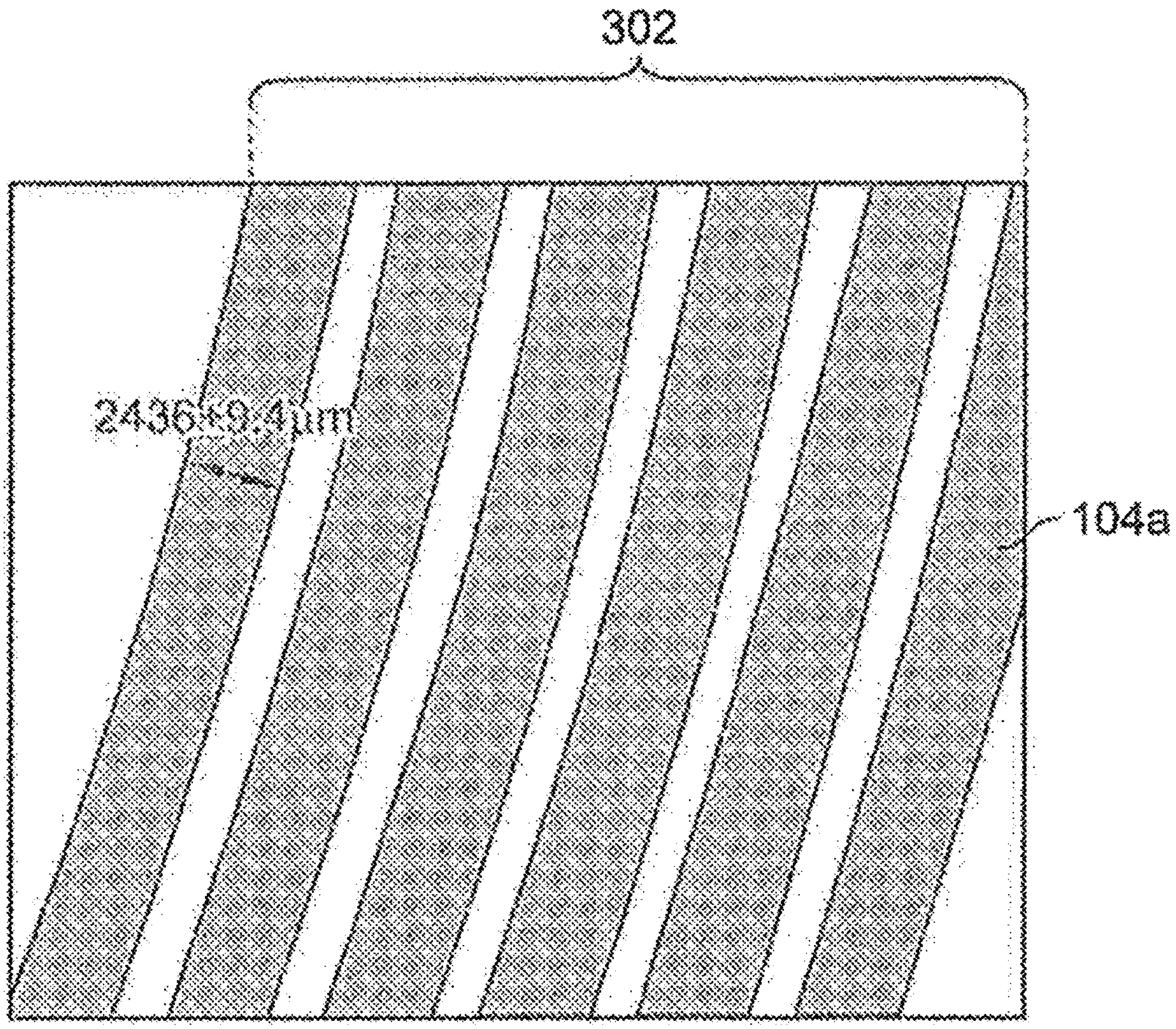
FIG. 5 is an illustration of a certain embodiment of a planar conductive coil.

FIG. 5 is a magnified illustration of the significant line density 302 of traces 104*a* that may be produced in certain of the embodiments. As referenced herein, the performance provided by the enhanced line density 302 may be further improved through the use of printing on both sides of a substrate, such as through the use of vias running between the top and bottom printed coils.

Figure 6:
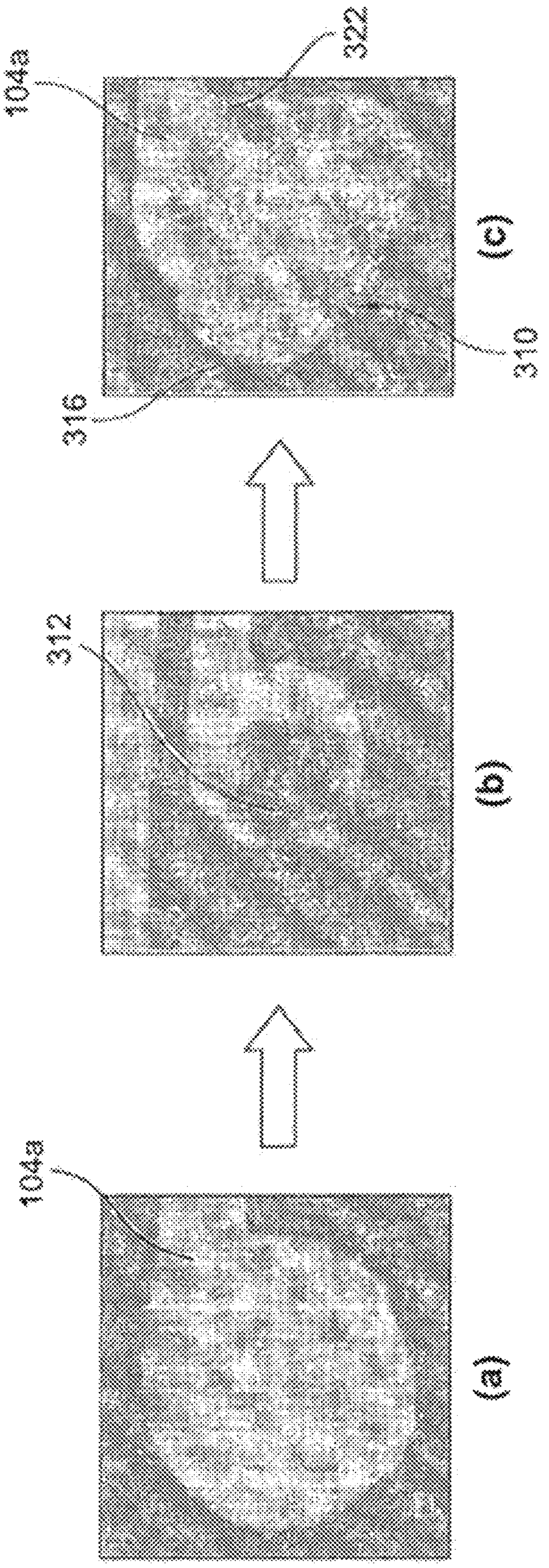
FIG. 6 is an illustration of exemplary via formation to conductively connect multiple planar inductive coils.

FIG. 6 illustrates an exemplary via 310 formation to conductively connect the traces 104*a* of multiple planar inductive coils. In this example, a through-hole 312, such as a through-hole in the range of 0.005-0.05 inches, or more particularly 0.05 inches, is cut in the trace 104*a* of at least one coil, as illustrated in steps (a) and (b). Conductive ink 316 may then be dispensed to connect the top side 104*a* and bottom side coil traces 322 through the via 310. This dispensing may be single sided, or may occur on both sides, such as in a sequence or simultaneously. The connected via 310, filled with the conductive ink, conductively mates the top 104*a* and bottom coil traces 322, as illustrated in step (c).

Figure 7:
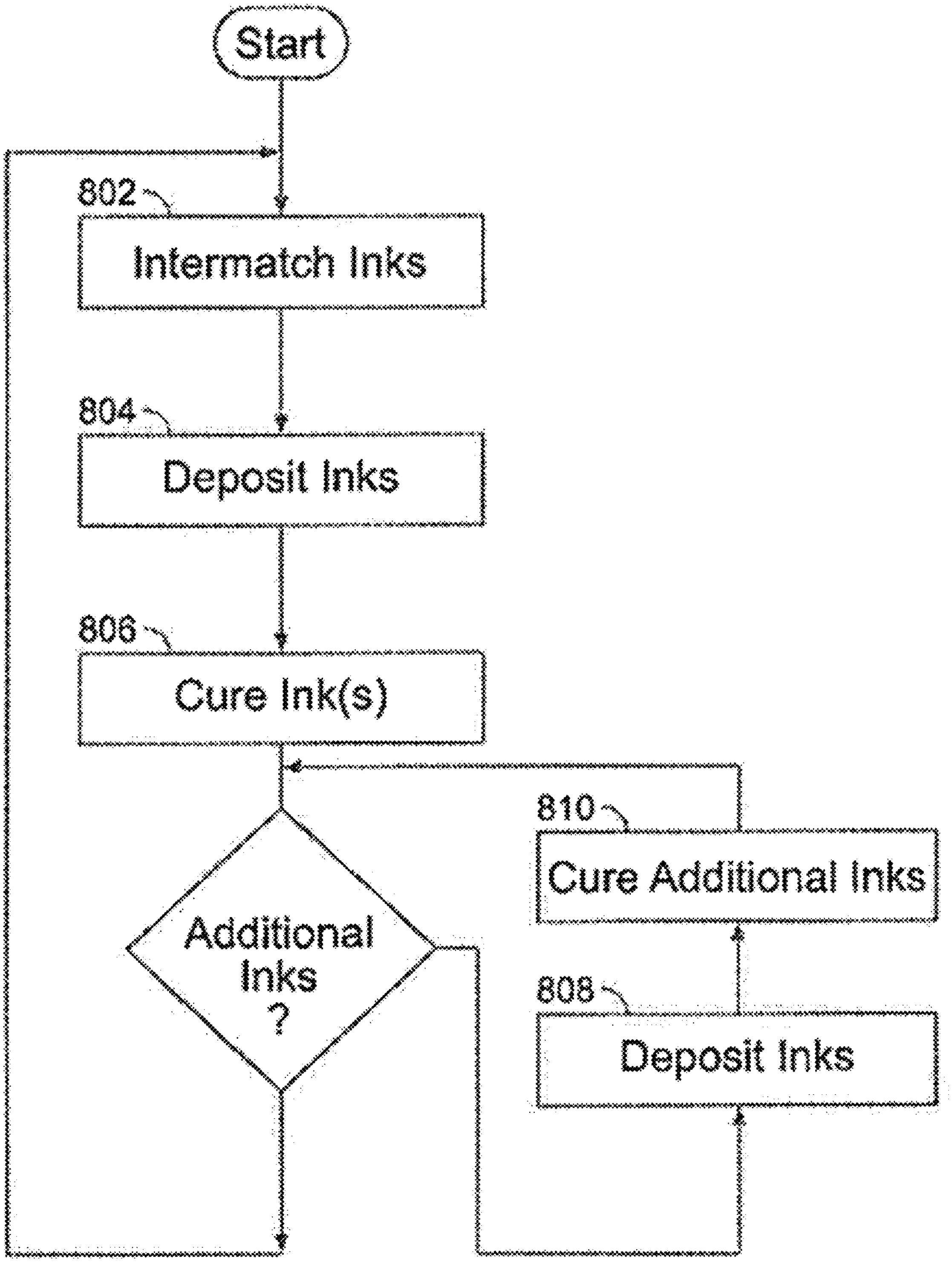
FIG. 7 is a flow diagram illustrating an exemplary method of providing an additively processed planar inductive coil.
Figure 8:
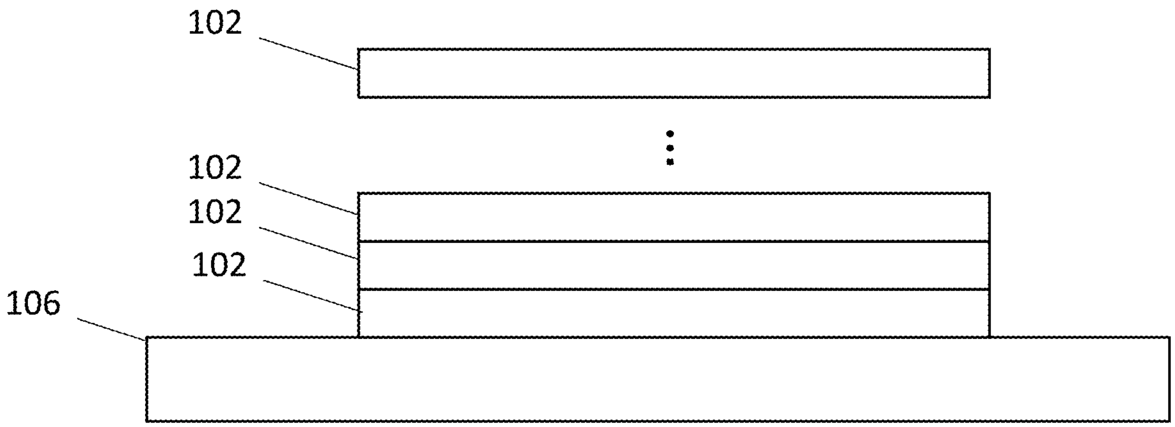
FIG. 8 is an illustration of a certain embodiment of a printed planar conductive coil showing a set of successive additively printed conductive ink layers 102 located atop one another, with a base layer being located directly on a flexible substrate 106.

FIG. 7 is a flow diagram illustrating an exemplary method 800 of providing an additively processed planar inductive coil. At step 802, an ink set, i.e., a deposited material set, is inter-matched, as that phrase is employed throughout, for use to print compatible ink layers within the ink set, and is matched to the receiving substrate for the planar inductive coil(s). At step 804, a conductive layer formed of at least one ink from the ink set is additively deposited/applied on the substrate at a desired density.

At step 806, the additively deposited layer may be cured/dried/sintered. Of note, coils on different layers or substrate faces may be stacked or otherwise linked, as discussed herein. For example, at step 808, a second ink may be deposited, such as to connect, through one or more vias, multiple ones of the planar conductive coils printed at step 804. At step 810, these connective ink deposits may be cured as needed.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A flexible planar inductive coil suitable for embedding in a product, comprising:

at least one flexible substrate receptive to additive printing of inks;

a set of successive additively printed ink layers, each matched to at least:

a receptivity of the flexible substrate onto which the additively printed ink layers are printed;

a conductivity of the substrate; and a chemical reactivity as between the substrate and each of the additively printed ink layers;

the set of additively printed ink layers being successively located atop one another, each of the additively printed ink layers having a printed line height in a range of 4.58 μm+/−0.6 μm, and a base one of the successively located additively printed ink layers being located directly upon the at least one flexible substrate, the successive ones of the successively additively printed ink layers being successively located on the base one to in combination form at least one first additive concentrically successive conductive trace located and sized with alternating line widths and inter-line gaps about a first center axis, the first additive concentrically successive conductive trace being capable of receiving current flow from at least one source in at least one plane parallel to the at least one substrate;

at least one via between successively additively printed layers, wherein the at least one via is substantially outside all of the successive conductive traces; and at least one second additive concentrically successive conductive trace about a second center axis, comprising a second set of successively additively printed ink layers, capable of receiving current flow through the at least one via from the first additive concentrically successive conductive trace;

wherein at least one of the first or second additive concentrically successive conductive traces comprises a variable trace line width or a variable pitch.

2. The flexible planar inductive coil of claim 1, wherein the at least one trace is at least one of circular and ovular.

3. The flexible planar inductive coil of claim 1, wherein the flexible planar inductive coil comprises an acoustical coil.

4. The flexible planar inductive coil of claim 1, wherein the flexible planar inductive coil comprises an antenna coil.

5. The flexible planar inductive coil of claim 1, wherein the at least one via is at least partially filled with a conductive fill.

6. The flexible planar inductive coil of claim 1, wherein the at least one second additive concentrically successive conductive trace is within the plane of and on an opposing face of the at least one substrate.

7. The flexible planar inductive coil of claim 1, wherein the first center axis and the second center axis are substantially uniform.

8. The flexible planar inductive coil of claim 1, wherein the at least one first additive concentrically successive conductive trace and the at least one second additive concentrically successive conductive trace comprise an electrically series planar inductive coil.

9. The flexible planar inductive coil of claim 1, wherein the set of additively printed inks comprises at least one of a silver, gold, aluminum, and copper.

10. The flexible planar inductive coil of claim 1, wherein the conductive traces comprise at least one of a screen printed, gravure printed, flexographically printed, inkjet printed, and aerosol jet printed conductive trace.

11. The flexible planar inductive coil of claim 1, wherein the conductive traces comprise cured conductive traces.

12. The flexible planar inductive coil of claim 1, wherein the planar inductive coil is inductively coupled to at least one secondary inductive coil.

13. The flexible planar inductive coil of claim 1, wherein the plane comprises a magnetic plane.

14. The flexible planar inductive coil of claim 1, wherein the at least one first additive concentrically successive conductive trace and the at least one second additive concentrically successive conductive trace comprise an electrically parallel planar inductive coil.

15. The flexible planar inductive coil of claim 1, wherein at least one of the first or second additive concentrically successive conductive traces comprises a trace line height of 4 to 5 μm.

16. The flexible planar inductive coil of claim 1, wherein the set of additively printed inks comprises an organic conductive ink.

17. The flexible planar inductive coil of claim 1, wherein the at least one trace is hexagonal.

18. The flexible planar inductive coil of claim 1, wherein the at least one trace is rectangular.

19. The flexible planar inductive coil of claim 1, wherein the at least one trace is octagonal.

* * * * *